(No Model.) 3 Sheets—Sheet 2.
C. C. HUNTER.
COMBINED CULTIVATOR AND SEED DRILL.
No. 447,188. Patented Feb. 24, 1891.
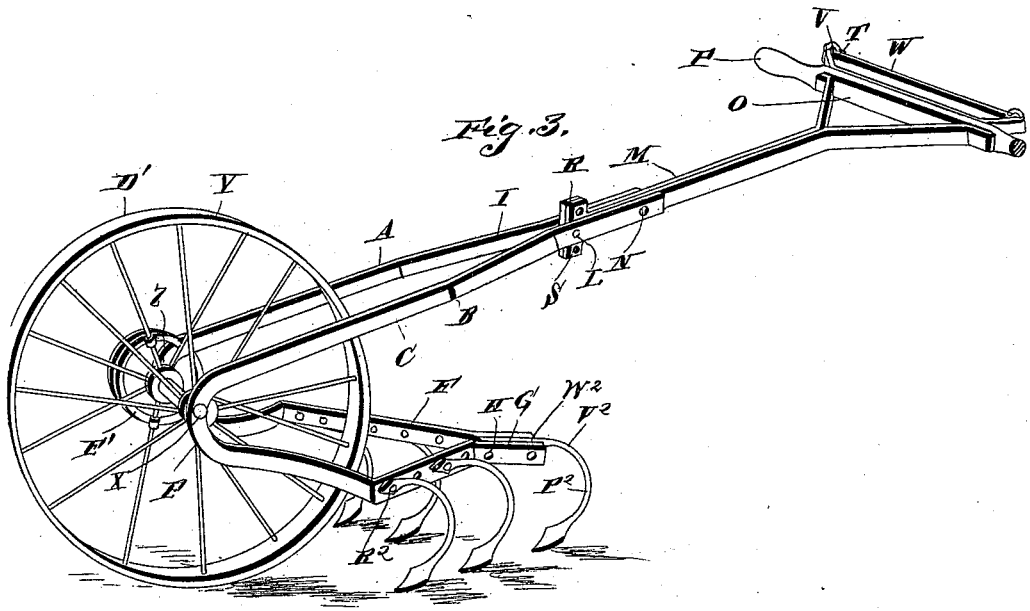
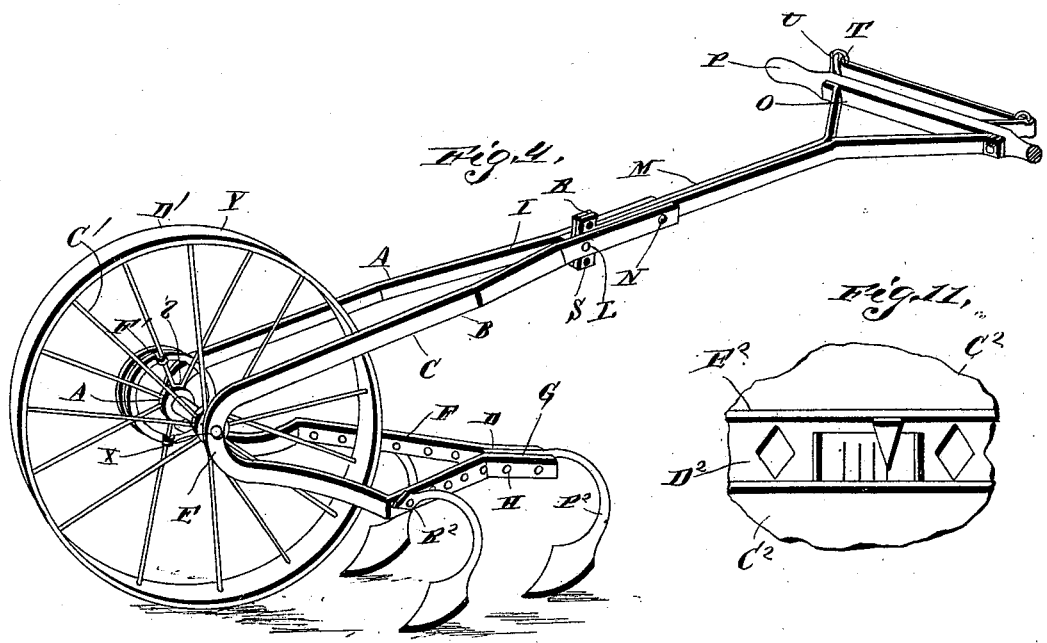
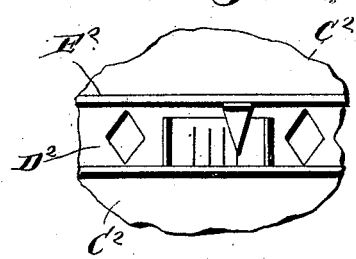
Witnesses
Inventor
C. C. Hunter
By Attorneys (No Model.) 3 Sheets—Sheet 3.
C. C. HUNTER.
COMBINED CULTIVATOR AND SEED DRILL.
No. 447,188. Patented Feb. 24, 1891.
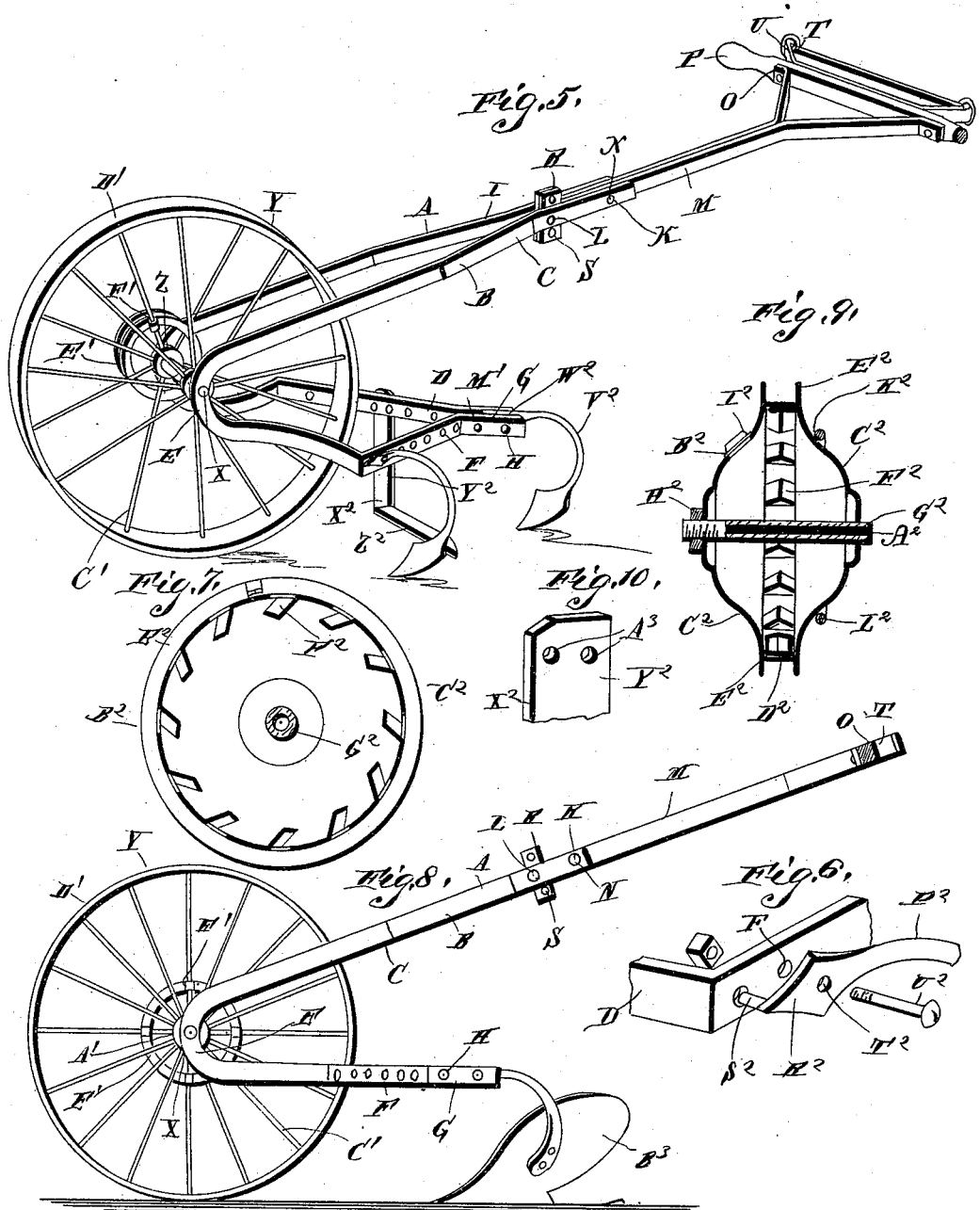

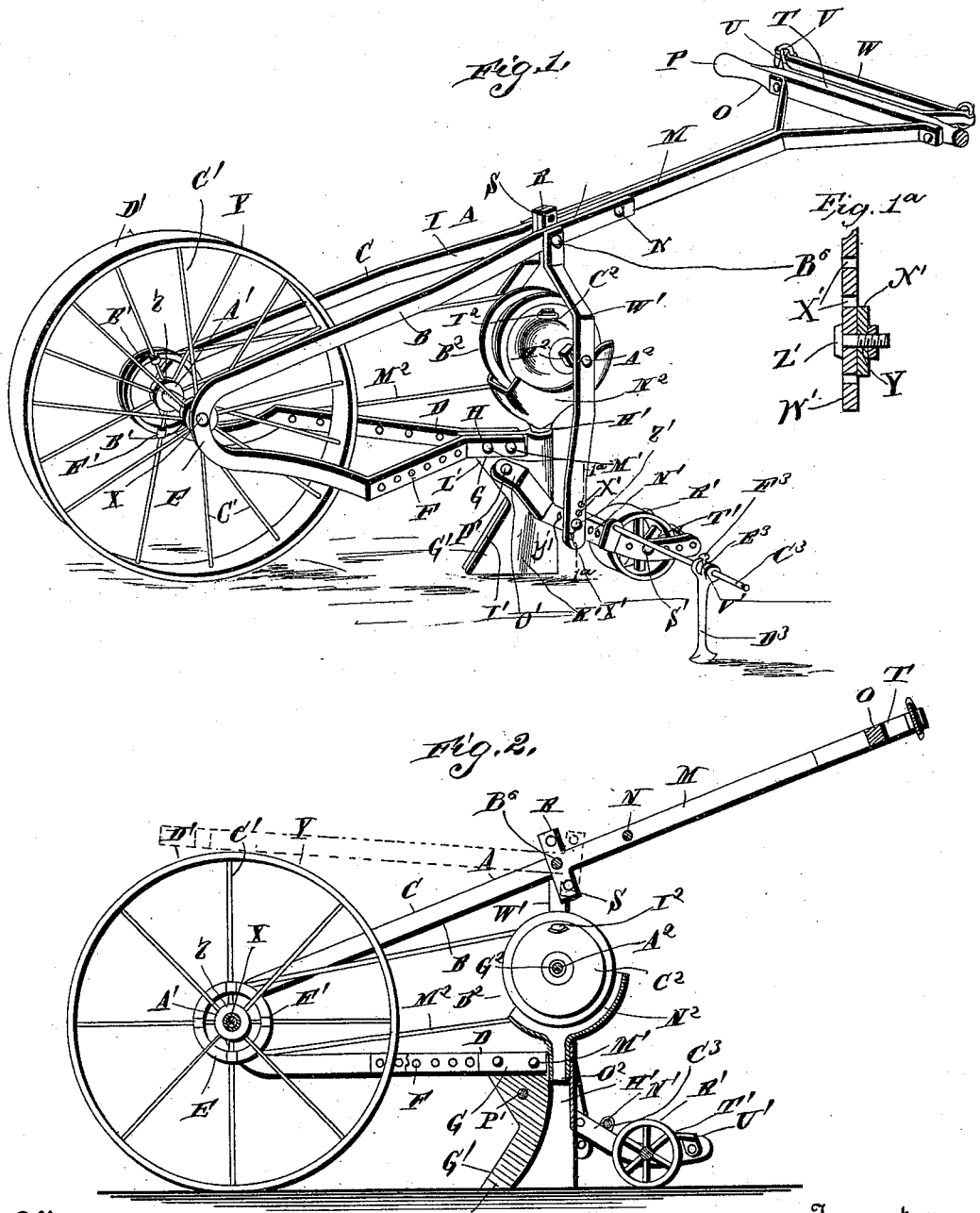

UNITED STATES PATENT OFFICE.

CHRISTOPHER COLUMBUS HUNTER, OF TOPEKA, KANSAS.

COMBINED CULTIVATOR AND SEED-DRILL.

SPECIFICATION forming part of Letters Patent No. 447,188, dated February 24, 1891.

Application filed September 14, 1888. Serial No. 285,356. (No model.)

*To all whom it may concern:*

Be it known that I, CHRISTOPHER COLUMBUS HUNTER, a citizen of the United States, residing at Topeka, in the county of Shawnee and State of Kansas, have invented a new and useful Improvement in a Combined Garden-Cultivator and Seed-Drill, of which the following is a specification.

My invention relates to an improvement in combined garden-cultivators and seed-drills; and it consists in the peculiar construction and combination of devices that will be more fully set forth hereinafter, and particularly pointed out in the claims.

This invention is an improvement on the cultivator for which Letters Patent of the United States No. 356,129 were granted to me January 18, 1887, and for which Letters Patent of the United States No. 331,885 were granted to me December 8, 1885.

The object of my invention is to provide an improved form of frame to which the supporting and driving wheel and the cultivating plows or shovels are to be attached.

A further object of my invention is to provide an improved form of handle or push-bar by means of which the machine may be propelled.

A further object of my invention is to effect an improvement in the devices to carry the roller, whereby the latter may be adjusted vertically, so as to cause the furrow-opener to operate at any desired depth.

A still further object of my invention is to effect an improvement in the construction of the revolving drum or hopper.

In the drawings, Figure 1 is a perspective view of my improved machine, showing the same adjusted for use as a seed-drill. Fig. 1$^a$ is a sectional detail view taken on the line 1$^a$ 1$^a$ in Fig. 1. Fig. 2 is a longitudinal sectional view of the same. Fig. 3 is a perspective view of my improved machine when adjusted for use as a cultivator. Fig. 4 is a similar view showing a smaller number of larger cultivating-shovels attached to a machine. Fig. 5 is a perspective view of my improved machine, showing the same provided with cultivating teeth or shovels and with a weeding implement. Fig. 6 is a perspective detail view of a portion of the frame, showing the means for attaching one of the cultivating plows or shovels thereto. Fig. 7 is a detailed longitudinal sectional view of the seed drum or hopper. Fig. 8 is an elevation of my improved machine, showing a turning-plow attached thereto. Fig. 9 is a detail transverse sectional view of the hopper. Fig. 10 is a detail view of a portion of the weeding implement. Fig. 11 is a detail view of measuring device.

The main frame A of the machine is composed of a pair of flat metallic bars B, each of which is bent to form a rearward and upwardly-inclined arm C and a rearwardly and horizontally extending arm D. That portion of each bar which connects the arms C and D is curved to form a semicircle, as at E. The arms D have their front portions curved outward for a suitable distance and extending in opposite directions, and the rear portions of said arms D are straight and caused to converge rearwardly, and thereby form a substantially V-shaped horizontal frame having its vertex at its rear side. The said oblique converging portions of the arms D are provided each with a series of openings F, and the extreme rear ends of the said oblique portions of the arms are bent at an obtuse angle to form rearward-extending parallel ears G, which are provided with a pair of transverse openings H, the said openings registering with each other. The front and extreme rear portions of the arms C are parallel and the intermediate portions I of the arms C converge rearwardly, as shown. In the extreme rear ends of the arms C are transverse openings K, and at suitable distances in advance of the said openings are similar openings L.

M represents a push-bar, which is formed of two pieces of bar metal of suitable length, breadth, and thickness, which are secured together by means of bolts N and have diverging rear ends secured to a transverse bar O, which is provided at its ends with handles P. The front end of the push-bar M is inserted between the rear ends of the arms C and is pivoted at a suitable distance from its extremity on a bolt which passes through the opening K and through an opening in the push-bar. The extreme front end of the push-bar has a cross-piece R, provided with a series of transverse openings S, which are concentric with the opening K. A bolt passes through the openings L and through one of the openings S and serves to secure the push-bar between the rear ends of the arms C and to arrange and retain the said push-bar at any desired inclination with reference to the said arm, thus adapting the rear end of the push-bar to be raised or lowered, according to the height of the person who is to operate the machine.

On the rear side of the cross-bar O is arranged a yoke T, which is provided at its ends with rearward-diverging arms U, the latter having eyes formed at their outer extremities, in which are pivoted a pair of rings V.

W represents a pushing-strap, which is stretched tightly between the rings V and has its ends secured to the said rings.

X represents a bolt which is passed through a pair of transverse openings in the central portion of the semicircular parts E of the frame C, and is provided at one end with a clamping-nut. On this bolt is journaled a driving and supporting wheel Y, the construction of which is as follows:

Z represents the hub, which comprises a cylindrical sleeve that is provided near its ends with annular flanges $A'$. On the projecting ends of the sleeve are fitted circular rings $B'$, which are adapted to be secured against the outer sides of the flanges $A'$, and between the opposing sides of said flanges and rings are fitted the inner ends of spoke-rods $C'$. The said spoke-rods are in two separate series at opposite ends of the sleeve, and are arranged out of line with each other, and are further inclined in opposite directions and have their outer ends secured in a rim $D'$, which is made of steel or other suitable metal.

$E'$ represents a band wheel or pulley, which forms a grooved ring that bears against the spokes on one side of the driving-wheel and is arranged concentric with the said wheel. On the inner side of the said grooved ring are formed clamp-ears $F'$, which are bent around the spoke-rods, and thereby the band wheel or pulley is rigidly secured on one side of the driving-wheel.

$G'$ represents a furrow-opener, which is formed from a single piece of plate metal of suitable thickness, which is bent centrally to form a circular vertical tube $H'$, so as to bring the opposite sides of the metal plate in contact with each other, as at $I'$. A substantially V-shaped incision is made in the front edge of the furrow-opener, so as to form the foot $K'$, having the rearward and upward inclined front edge and the head $L'$. A vertical opening is made in the metal plate below the tubular portion $H'$ thereof, and the rear corners of the sides of the plate, which form the foot $K'$, are inclined obliquely and caused to diverge rearward, and thereby adapt the foot to open a furrow of suitable width to receive any kind of seeds. The head of the furrow-opener is adapted to be secured between the rear ends of the arms D of the main frame by means of transverse bolts $M'$.

By removing these bolts the furrow-opener may be readily detached from the said arms, as will be readily understood.

$N'$ represents a pair of arms of suitable length, which have their rear ends curved upward and have their front ends bent inward and provided with ears $O'$. Said ears bear against opposite sides of the head of the furrow-opener and are secured thereto by a pivotal bolt $P'$, and the arms $N'$ are thereby adapted to have their rear ends raised or lowered, for the purpose presently described.

$R'$ represents a roller of suitable breadth and diameter, which is provided at its center on opposite sides with trunnions $S'$, that are adapted to bear in openings in the arms $N'$ at a suitable distance from the rear ends of the said arms.

$T'$ represents a scraper, which is provided at its ends with ears $U'$, which are arranged at right angles thereto. The said ears bear against the inner sides of arms $N'$ at the rear ends thereof and are secured to said arms by pivotal bolts $V'$, and the front edge of the scraper is caused to bear against the rear side of the roller, the function of the scraper being to prevent earth from adhering to the roller when the machine is in operation.

$W'$ represents a pair of standards or arms which have their upper ends secured near the rear ends of the arms C of the main frame by means of the bolt $B^6$, which connects the front end of the push-rod to the said arm. The upper portions of the arms or standards $W'$ are curved and connected to the frame-bars C by the bolt $B^6$, which connects the said frame-bars with the push-bar. The lower ends of said arms or standards are caused to approach to within a suitable distance of each other, and are provided each with a vertical series of openings $X'$, either of which is adapted to register with openings $Y'$ in the arms $N'$ at a slight distance in rear of the furrow-opener. Bolts $Z'$ are inserted in said openings $X'$ and $Y'$ and serve to secure the arms $N'$ to the arms or standards $W'$ at any desired vertical adjustment. From this construction it follows that the roller may be raised or lowered to cause the furrow-opener to operate at any desired depth in the ground, and thus adapt the machine for properly planting all kinds of seeds.

$A^2$ represents a bolt, which connects the arms or standards $W'$ together at a suitable distance from their upper ends. $B^2$ represents the drum or hopper, which is formed of two substantially semi-spherical detachable parts or sides $C^2$. Said parts or sides are provided at their meeting edges with circular rims $D^2$, which are adapted to overlap each other, and are further provided with outwardly-extending flanges $E^2$. The rims of the said sections are provided at suitable intervals with diamond-shaped slots, which are adapted to register with each other, so as to open the slots to the maximum extent, and thereby adapt the drum or hopper to drop a maximum quantity of seed. When it is desired to decrease the quantities of seed dropped from the drum or to make the openings thereof smaller, so as to adapt the same for sowing fine seed, the rim of one of the sections is turned or shifted over the other rim, so as to throw its slots or openings out of alignment with the slots or openings in the other rim to the necessary extent. On the inner side of the inner rim are secured cups $F^2$, which are triangular in cross-section, the said cups depending in an inclined line from the inner face of the rim and registering at their outer ends with the slots or openings of the rims. One side of each of these cups is left open to admit the entrance of the seed from the drum, and since the cups are arranged in an inclined position the seeds in the lower side of the hopper or drum will be caused to pass through the lowermost openings of the drum when the same is rotated, as will be readily understood.

$G^2$ represents a tube, which extends through the center of the seed drum or hopper, has one end rigidly secured to one of the sections thereof, and has its opposite end passed loosely through a central opening in the other section and provided with screw-threads. A nut $H^2$ is screwed to the threaded end of the tube and serves to clamp the sections of the drum or hopper together. The bolt $A^2$ passes through the tube $G^2$, the latter forming the bearing for the hopper or drum. One section of the drum is provided with a removable screw-cap 12, by means of which seeds may be introduced to the drum, and the other section of the drum is provided with an annular groove $K^2$.

$L^2$ represents a ring, which is formed of wire of suitable thickness. The said ring is soldered in the groove $K^2$ and thereby forms a flange. An endless belt $M^2$ engages the groove $K^2$ and the groove-pulley on the driving-wheel, so as to impart the rotary motion of the driving-wheel to the drum, and the flange before described serves to keep said belt in the groove $K^2$.

$N^2$ represents a funnel, which is provided with a depending spout $O^2$, that fits in the upper end of the seed-tube $H'$ of the furrow-opener, and thereby secures the funnel thereon and arranges it directly below the hopper in such a position that it catches the seeds which drop from the hopper and conveys them to the tube $H'$, from which they fall into the furrow. The roller which travels in rear of the furrow-opener serves to cover the seeds and to press the earth firmly upon them.

$P^2$ represents a series of cultivating points or shovels, which are provided with curved standards that have their upper ends flattened and lozenge-shaped, so as to provide heads $R^2$. The said heads are bent laterally at a slight angle with relation to the standard and are adapted to bear against the outer sides of the converging portion of the arms D. Each head has at its front end an inwardly-extending stud $S^2$, which is adapted to enter one of the openings F, and has an opening $T^2$, which registers with one of said openings. Bolts $U^2$ pass through the registering openings in the arms D and in the heads and clamp the latter to the said arms. The studs $S^2$ serve to prevent the cultivating plows or shovels from turning pivotally on the clamping-bolts, as will be readily understood.

$V^2$ represents a similar cultivating plow or shovel, which has a curved standard that is provided at its upper end with a rectangular head $W^2$, that is flattened on opposite sides and adapted to be inserted between the ears G at the rear ends of the arms D when the furrow-opener has been removed, and a pair of clamping-bolts pass through the openings in said ears G and in the head $W^2$ and serve to secure the latter firmly between the ears. When the shovels or plows are thus attached to the arms D of the frame, and the furrow-opener, the roller, the hopper, and the arms or standards Y removed, the machine forms a cultivator, as shown in Fig. 3. I prefer to use two or three of the plows or shovels $P^2$ on each side of the frame. In the drawings two have been shown; but the number of said shovels may be increased or decreased at will. Owing to the oblique arrangement of the rear portions of the arms D, the shovels or plows which are attached thereto are arranged out of line with each other, so that no two of them travel in the same path, and hence the said plows or shovels are adapted to form parallel proximate furrows in the soil and to effectually stir and loosen the same.

As shown in Fig. 4, a smaller number of larger cultivating-shovels are attached to the larger converging portions of the arms D in lieu of the cultivating-shovels hereinbefore described, this arrangement of the machine adapting the same to stir the soil more deeply and to work in stiffer soil.

$X^2$ represents a weed-cutter, which comprises a vertical arm $Y^2$, having its lower end bent at right angles and fashioned into a blade $Z^2$, the said blade being arranged obliquely with relation to the arm $Y^2$ and having its front edge sharpened and its lower side flat. The upper end of the arm $Y^2$ is provided with a series of adjusting-openings $A^3$. A pair of clamping-bolts is adapted to pass through two of these openings and through two of the openings of one of the arms D, so as to secure the weed-cutter to the said arm. When the weed-cutter is thus employed, the cutting teeth or shovels are removed from the arm to which they are attached and only those secured to the opposite arm D employed, thereby arranging the machine as shown in Fig. 5. The cultivating shovels or plows attached to one arm D serve to stir and loosen the soil, and the blade of the weed-cutter runs at a slight distance below the surface of the soil and serves to effectually destroy the roots of noxious weeds.

$B^3$ represents a turning-plow, which may be attached to one of the arms D of the main frame in lieu of the cultivating teeth or shovels hereinbefore described, as shown in Fig. 8, so as to adapt the machine for use in ridging the earth or hilling up growing plants. The standard of this turning-plow has a lozenge-shaped head provided with a stud and is in all respects similar to the standards of the cultivating shovels or plows.

When the machine is adjusted for use as a seed-drill, as shown in Fig. 1, I attach a horizontally-extending arm $C^3$ to one of the arms $N'$ and arrange the said rod $C^3$ so that it projects from one side of the machine. A marker-bar $D^3$ has its upper end forked or bifurcated and pivoted on the rod $C^3$ and adapted to be moved in or out upon the said rod. The lower end of the marker-bar is weighted and is adapted to trail on the ground at a suitable distance to one side of the machine, so as to mark a guide-line for the return row. A collar $E^3$ is arranged on the rod between the forks at the upper end of the marker-bar, and is adapted to be moved out or inward on the rod, and has a clamping-screw $F^3$, by means of which it may be secured to the rod at any desired point, so as to secure the marker-bar at any desired distance from the furrow-opener. The operator grasps the handles at the rear end of the push-bar and presses with his body against the strap which is stretched between the arms of the fork upon the rear side of the cross-bar, and thereby is enabled to exert his entire force, if necessary, in propelling the machine. The strap W serves as a spring to prevent concussion of the cross-bar against the body of the operator when the furrow-opener encounters an obstruction, and thus relieves the operator of unpleasant and fatiguing shocks and strain.

A seed-drill and cultivator thus constructed is exceeding strong and durable, is very simple and light, and may be manufactured at a slight cost.

The machine is especially adapted to the wants of nurserymen and gardeners and is capable of doing all the work that has been heretofore preformed with hand implements.

Having thus described my invention, I claim—

1. In a hand-cultivator, the frame comprising the two similar bars B, separated from each other and arranged edgewise and bent at an intermediate point, so as to form the arms C D, the arms C extending upward on an incline and secured together at their outer upper ends, and the arms D extending rearward beneath the arms C in a horizontal plane and bent first outwardly to a point and then bent inwardly until the two arms closely approach each other, thereby forming somewhat the shape of a diamond in plan view, substantially as described.

2. In a hand-cultivator, the frame comprising the two similar bars B, separated from each other and arranged edgewise and bent at an intermediate point, so as to form the arms C D, the supporting-wheel journaled at the point where the bars B are bent, the arms C extending upward on an incline and secured together at their outer upper ends, the push-bar or handle secured to the arm C at that point, and the arms D extending rearward beneath the arms C in a horizontal plane and bent first outwardly to a point and then bent inwardly until the two arms closely approach each other, thereby forming somewhat the shape of a diamond in plan view, and the implements to act on the soil attached to the arms D, substantially as described.

3. In a hand-cultivator, the arms D, extending rearward from the supporting-wheel and first bent outwardly to a point and then bent inwardly till the ends of the arms touch, or nearly so, thereby forming an approximately diamond-shaped frame, the sides of which are perforated for the removable attachment of various implements to act on the soil, as set forth.

4. The hand cultivator or seeder having the push-bar and the cross-bar provided with handles at its ends, the yoke secured on the outer side of the cross-bar, and the strap connecting the arms of the yoke and arranged parallel with the cross-bar, the handles standing on each side and in advance of the strap, substantially as described.

5. The cultivator or seeder having the push-bar, the cross-bar secured to the rear end thereof, the yoke secured to the rear side of the cross-bar and having the rearward-diverging arms, the rings attached to eyes in the rear ends of said arms, and the strap stretched between and secured to the said rings, substantially as described.

6. The combination of the frame, the driving-wheel journaled in the front end of the frame, the furrow-opener attached to the rear ends of the frame, the arms $N'$, having their front ends pivoted to the furrow-opener, the roller journaled between said arms, the arms or standards $Y'$, having their upper ends pivoted to the handles and their lower ends attached to arms $N'$, the bolt $A^2$, connecting said arms or standards $Y'$, the drum or hopper journaled on said bolt, and devices for connecting the driving-wheel with the drum or hopper, substantially as described.

7. The combination of the frame having the rearward and upward extending arms C and the rearward-extending arms D with the driving-wheel journaled in the front end of the frame, the furrow-opener attached to the rear ends of arms D, the arms $N'$, having their front ends pivoted to the furrow-opener, the roller journaled between said arms, the arms or standards $W'$, having their upper ends pivoted to arms C and their lower ends attached to arms $N'$, the bolt $A^2$, connecting said arms or standards Y, the drum or hopper journaled on said bolt, the pulley attached to the driving-wheel, and the endless belt connecting the same to the drum, substantially as described.

8. The drum or hopper comprising the separable sections having the overlapping rims, and the tubular sleeves secured in the center of one section, passing through the center of the other section, and the clamping-nut engaging threads on said projecting end of the sleeve, substantially as described.

9. The combination, in a drum or hopper, of the separable sections having the overlapping rims provided with the seed-openings, the plate secured on one of the said rims, having the scale and the end stops, and the hand or pointer secured to one of the sections and adapted to sweep over the scale, substantially as described.

In testimony that I claim the foregoing as my own I have hereto affixed my signature in presence of two witnesses.

CHRISTOPHER COLUMBUS HUNTER.

Witnesses:
A. H. WETHERBEE,
LEE H. DOWLING.